United States Patent [19]
Montgomery

[11] Patent Number: 5,114,378
[45] Date of Patent: May 19, 1992

[54] CLOTHES PIN DOWN PULLER

[75] Inventor: Preston D. Montgomery, Amarillo, Tex.

[73] Assignee: Multiple Systems, Inc., Amarillo, Tex.

[21] Appl. No.: 651,961

[22] Filed: Feb. 7, 1991

[51] Int. Cl.$^5$ .............................................. A22B 5/16
[52] U.S. Cl. .................................... 452/128; 452/129
[58] Field of Search ................ 452/128, 125, 129, 130

[56] References Cited

U.S. PATENT DOCUMENTS

| | | | |
|---|---|---|---|
| 3,364,516 | 1/1968 | White | 452/129 |
| 4,275,481 | 6/1981 | Roberts | 452/129 |
| 4,392,274 | 7/1983 | Noroy | 452/129 |
| 4,417,367 | 11/1983 | Leining | 452/129 |
| 4,751,768 | 6/1988 | Trujillo, Sr. | 452/129 |

FOREIGN PATENT DOCUMENTS 251963  5/1964  Australia .............. 452/129

Primary Examiner—Willis Little
Attorney, Agent, or Firm—Wendell Coffee

[57] ABSTRACT

Apparatus and method for removing the hide from animal carcasses. The structure includes a slotted pulling pin that is attached to a loosened skin flap of the animal's hide. The pulling pin is mounted to a platform assembly. The platform assembly may be tilted thereby setting the height of the pulling pin with respect to the floor of a processing plant. The tilting or rocking of the platform is accomplished with height adjustment mechanism that are extendable and retractable. To facilitate attachment of the hide to the pulling pin, said hide is first manually detached from the upper hind end of the animal carcass which is hanging head end down. After attachment of the hide to the pulling pin, the pin is rotated by a hydraulic motor thereby pulling the hide from the animal carcass. The motor is positioned on the platform so that it is angled away from the pulling pin and is a distance from the animal carcass at all times during the pulling process.

16 Claims, 2 Drawing Sheets 5,114,378

CLOTHES PIN DOWN PULLER

BACKGROUND OF THE INVENTION (1) Field of the Invention

This invention relates to devices used for pulling hides from animal carcasses. More specifically, this invention relates to devices used in meat processing plants to pull hides from livestock carcasses, especially hides from bovine carcasses. Those skilled in the art are the operators of these hide pulling machines in the processing plants.

(2) Description of the Related Art

Hide pulling machines are well known devices in animal processing industries. Whether the animal is being skinned strictly for the hide or to facilitate later butchering of the carcass, hide pulling devices are regularly used in removal of the animals' skin or hide.

Before removal of the hide from livestock begins, the animal carcass is usually suspended by the animal's hind legs so that the carcass is hanging vertically with the animal's head end toward the processing plant's floor. The typical procedure for removing a hide begins at the uppermost hind end of the animal. The hide is initially loosened from the animal carcass so that a flap of hide is created that hangs down from the hind end of the animal toward the head end. The amount of hide initially detached from the carcass must be sufficient to attach to a hide pulling machine.

In most hide pulling processes the amount of hide required to be initially loosened is determined by the length of the individual animal measured from head end to hind end and the positioning of the hide pulling machine. The part of the hide pulling machine to which the hide is actually attached is typically fixed with respect to height. For that reason a greater amount of hide must be loosened from a shorter carcass so that the portion of loosened hide will be long enough to reach and be attached to the hide pulling machine. The portion of the machine that does the actual pulling must be positioned near or below the head of the carcass so that the hide may be pulled down from the hind end of the animal and over the head of the carcass. This over-the-head procedure makes it possible to remove the hide in one large piece.

U.S. Pat. No. 4,873,749 to COUTURE discloses an apparatus by which an animal carcass is suspended by its hind legs. In addition to the suspension apparatus, a hide pulling mechanism is also disclosed. While the pulling machine is not completely shown, it is explained that the hide is pulled downwardly either by linear motion or by rotation about a rotary device.

U.S. Pat. No. 3,930,284 to COOK discloses a hide pulling method and apparatus. COOK shows a mechanical means for pulling the hide from a beef carcass in a manner so as to avoid both damage to the carcass and the hide. The disclosed method includes pulling the hide from the skull of the carcass.

U.S. Pat. No. 3,537,130 to McDONNELL discloses a hide pulling process in which an electrical current is applied to the carcass while the hide is pulled over the head of the animal.

SUMMARY OF THE INVENTION (1) Progressive Contribution to the Art

This invention provides a hide pulling machine that comprises a platform upon which a hide pulling pin is mounted together with a motor that rotatably drives the pulling pin. The platform is pivotally mounted to a base unit making it possible to tilt or rock the platform about connecting pivot points. The pulling pin is oriented so that it is near a front side of the platform. In this configuration, the pulling pin may be adjusted with respect to height above a processing plant's floor by tilting the platform and thereby moving the pulling pin either up or down.

The ability to position the pulling pin at different heights above the floor of the processing plant is a benefit over the previously known devices. With the ability to move the pulling pin up and down, it is no longer necessary to detach the hide from the carcass to an extent that the detached portion of the hide is long enough to reach the pulling pin. Instead, only an amount of skin needed for actual attachment to the pulling pin is required to be loosened. No additional detachment is required to enable the hide to fall to a position low enough to be attached to the pulling pin. This invention accommodates the animal carcass. Other designs require the animal's hide to be loosened to an extent that accommodates a height-fixed pulling machine.

By reducing the initial labor intensive detachment of the hide and by allowing the pulling pin to mechanically strip most of the hide from the animal, both money and time is saved. The pulling machine does the majority of the hide removal while reducing the manual detachment previously required.

Another benefit of being able to adjust the pulling pin with respect to height is that carcasses of different lengths are easily accommodated by this pulling machine. Previously, if the animal carcass was particularly short, the entire animal would have to be hand skinned. With this invention's height adjustable pulling pin, the size or length of the carcass being processed is irrelevant.

Another benefit of this machine is the orientation of the rotary drive motor which powers the pulling pin. A center line of the pulling pin is parallel to the front side of the platform by which the carcass is positioned for the pulling process. The motor would likewise be positioned near the front side of the platform if the center axis of its drive shaft were co-linear with the center line of the pulling pin. In that configuration the motor would be positioned near to the carcass during the pulling process as well as near to the path of a passing carcass as the carcass is brought along side the machine and positioned adjacent to the pulling pin. For this reason, the motor in this invention is connected to the pulling pin by universal joints that allow a center line of the motor to be angled back away from the center line of the pin. By orienting the motor in this configuration, the carcass and the meat that is going to be processed therefrom is distanced from the workings of the motor since the motor is oftentimes dirty and could contaminate the animal carcass.

Additionally, a safety guard has been provided that covers the universal joints and a transfer shaft between the joints. The safety guard is required by O.S.H.A. regulations.

By having both the pulling pin and the drive motor fixed to the platform, this angled orientation is maintained throughout any height adjustment of the pulling pin. It is almost impossible for either the hide or the carcass to become fouled in any portion of the pulling machine other than where it is intentionally attached to the pulling pin.

During construction of the pulling pin, all sharp edges that could contact the hide during the pulling process are smoothed and beveled. In this way, damage to the hide is prevented as it is pulled from the carcass and allows the hide to be further processed into quality goods.

Both the height adjustment of the pulling pin and the distancing of the motor from the animal carcass enables this hide pulling device to be used on different types of animal carcasses. Additionally, it makes it possible for animal carcasses of the same type, but of widely varying sizes to be processed by the same pulling machine.

(2) Objects of this Invention

An object of this invention is to provide a device for pulling the hide from an animal.

Another object of this invention is to provide a hide pulling device that is adjustable with respect to height so that the hides of different sizes of animals are easily attached and removed.

Still a further object of this invention is to provide a hide pulling device with a motor that is angled away from and distanced from the animal carcass both during the hide pulling process and while the carcass is being positioned adjacent to the pulling device before the hide is attached to the hide pulling machine.

Yet another object of this device is to provide a hide pulling machine with smooth, beveled edges which do not damage the hide as it is attached to the pulling machine nor as the machine pulls the hide from the carcass.

Further objects are to achieve the above with devices that are sturdy, compact, durable, safe, efficient, versatile, and reliable, yet easy to operate and maintain.

Other objects are to achieve the above with a method that is rapid, versatile, efficient, and does not require highly skilled people to perform the required procedures.

The specific nature of the invention, as well as other objects, uses, and advantages thereof, will clearly appear from the following description and from the accompanying drawings, the different views of which are not necessarily scale drawings.

Figure 1:
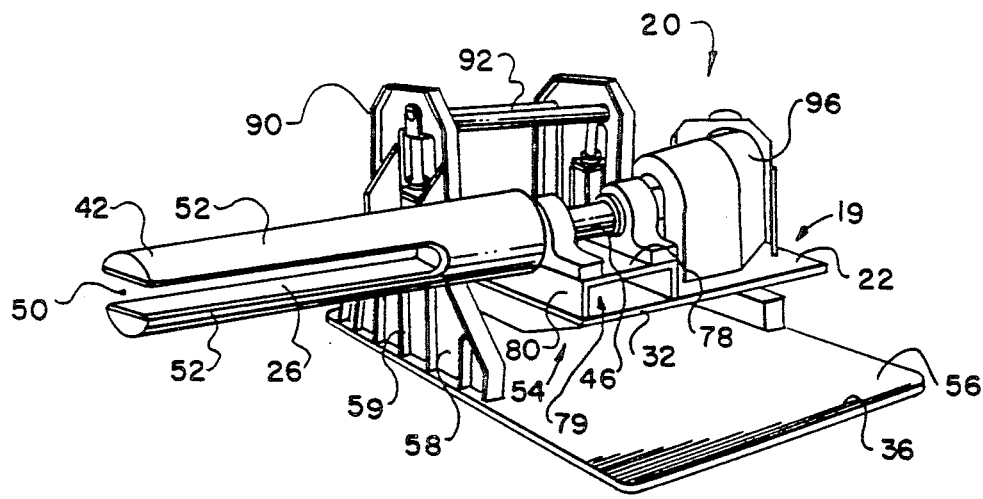
FIG. 1 is a perspective view of the Clothespin Down Puller looking at the front side of the platform.
Figure 2:
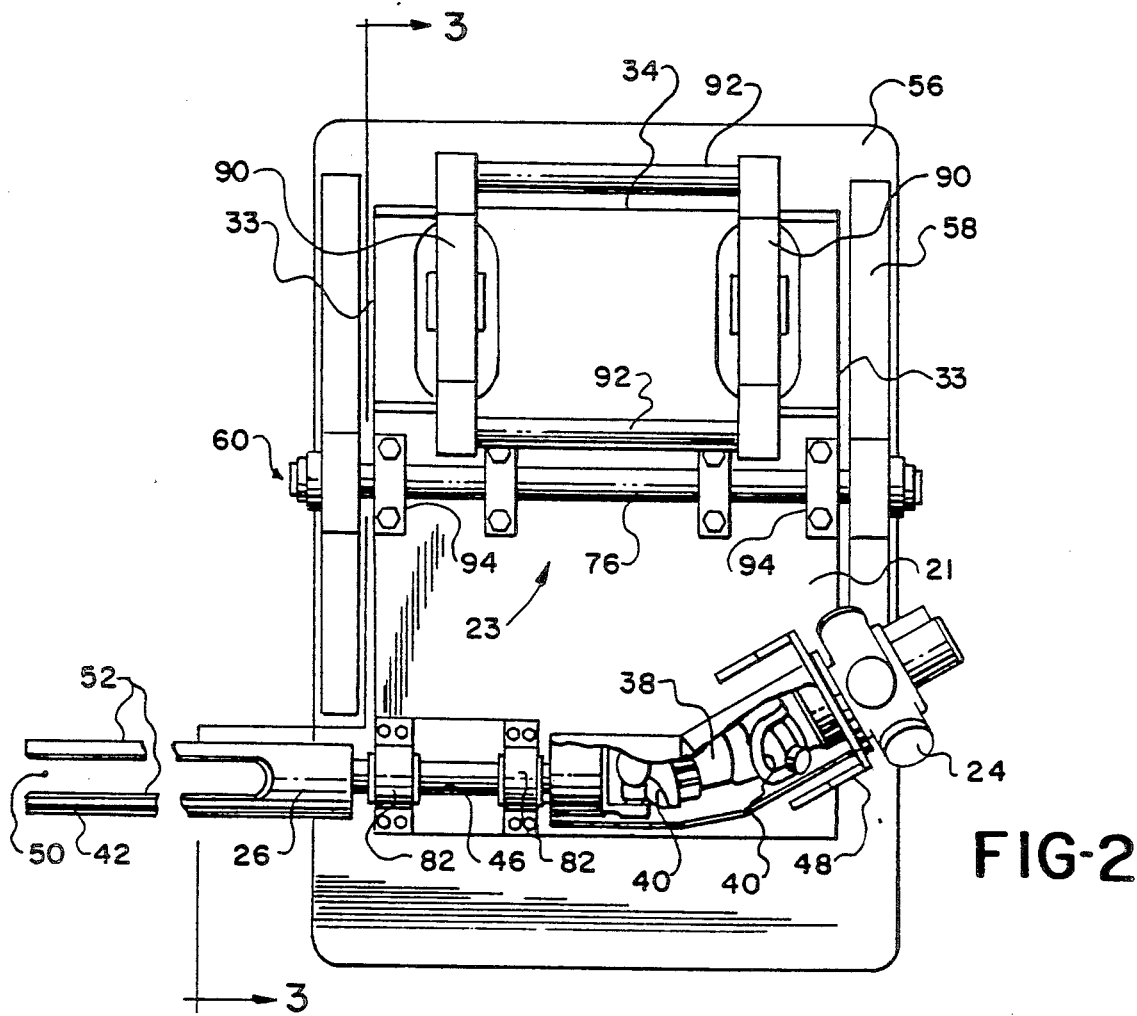
FIG. 2 is a top plan view of the Clothespin Down Puller.
Figure 3:
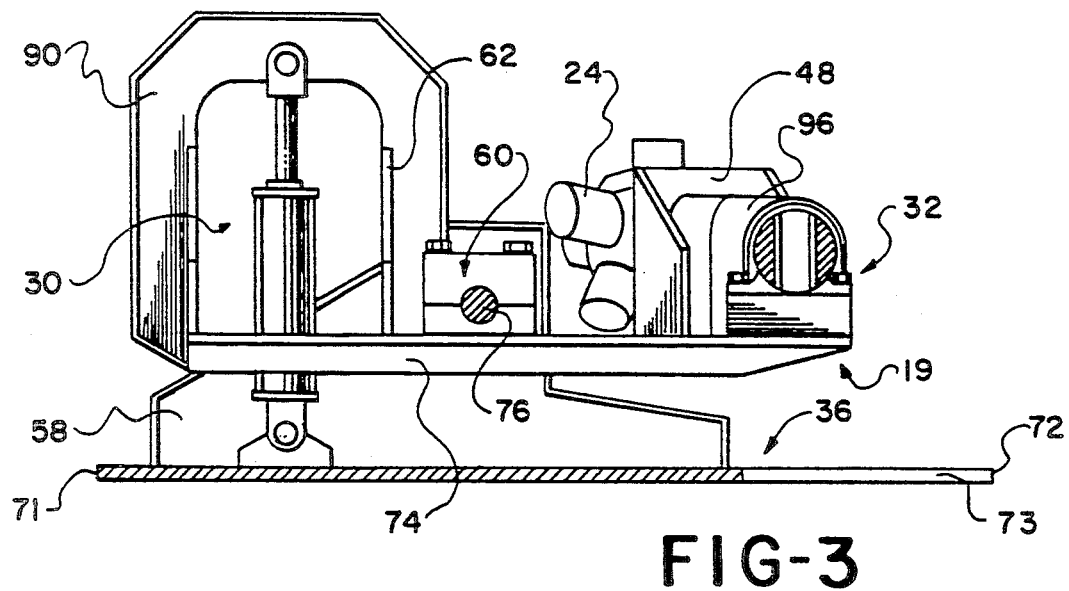
FIG. 3 is a section showing a side elevational view of the Clothespin Down Puller.
Figure 4:
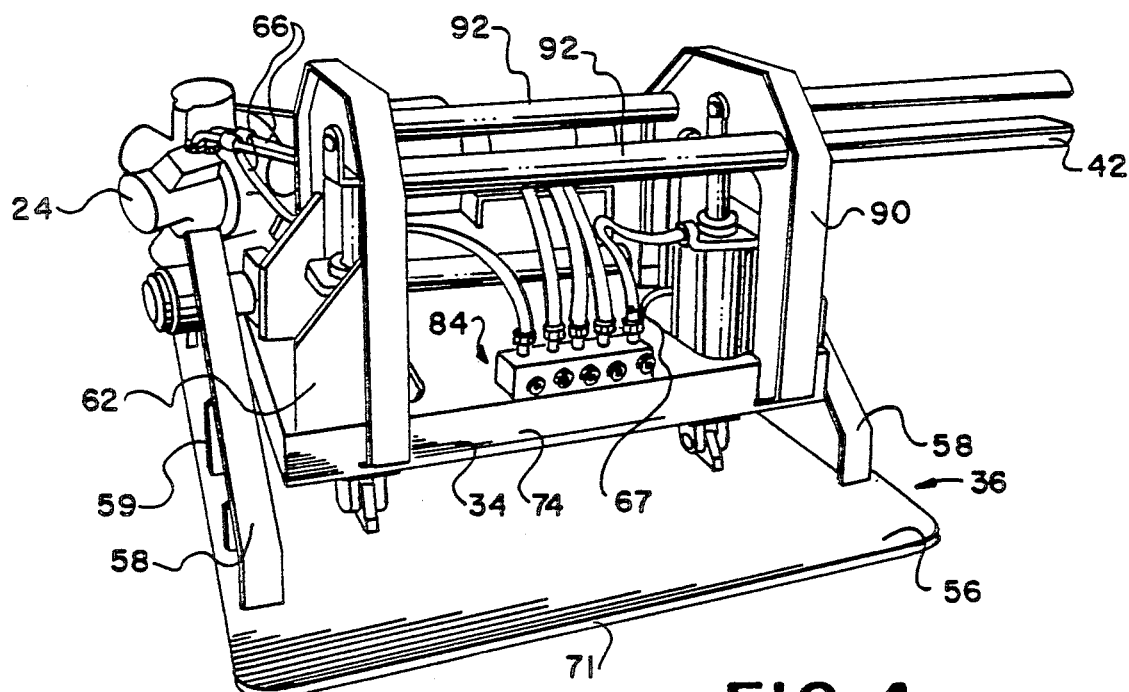
FIG. 4 is a perspective view of the Clothespin Down Puller looking at the back side of the hide pulling machine.

As an aid to correlating the terms of the claims to the exemplary drawings, the following catalog of elements and steps is provided:

| 10 | animal carcass |
| 11 | hide |
| 12 | hind legs |
| 19 | platform assembly |
| 20 | hide pulling machine |
| 21 | upper face |
| 22 | platform |
| 23 | hinge |
| 24 | motor |
| 26 | hide pulling pin |

-continued

| 30 | height adjustment mechanism |
| 32 | front side of the platform |
| 33 | lateral side |
| 34 | back side of the platform |
| 36 | base unit |
| 38 | transfer shaft |
| 40 | universal joint |
| 42 | hide engaging end |
| 46 | shaft end |
| 48 | mounting box |
| 50 | slot |
| 52 | prong |
| 54 | lower surface of the platform |
| 56 | foot stand |
| 58 | leg |
| 59 | leg reinforcement |
| 60 | tilt bearing assembly |
| 62 | fin |
| 66 | hydraulic motor fluid hose |
| 67 | hydraulic height adjustment fluid hose |
| 71 | back edge of foot stand |
| 72 | front edge of foot stand |
| 73 | lateral edge of foot stand |
| 74 | framing |
| 76 | tilting shaft |
| 78 | top plate |
| 79 | top plate lower face |
| 80 | riser |
| 82 | rotatable bearing assembly |
| 84 | hydraulic fluid distribution assembly |
| 88 | skin flap |
| 90 | height adjustment braces |
| 92 | brace strut |
| 94 | bearing block |
| 96 | safety guard |

DESCRIPTION OF THE PREFERRED EMBODIMENTS

Hide pulling machine 20 is designed to be fixed to the floor of an animal processing plant. The pulling machine 20 is supported upon a base unit 36. The base unit 36 includes a foot stand 56 which is located nearest the floor of the processing plant. The foot stand 56 is rectangular in shape but has rounded corners and is constructed from metal sheeting that is at least one-quarter of an inch thick. A platform assembly 19 is supported above the foot stand 56 by legs 58. There are two legs 58 fixed to the foot stand 56 so that each leg is oriented upright and parallel to lateral edges 73 of the foot stand 56. The legs 58 are constructed from metal sheeting similar to that used in the construction of the foot stand 56. A bottom of each leg 58 is welded to the foot stand 56. There is bracing about the perimeter of each leg 58 constructed from metal stripping that projects perpendicularly away from an outside surface of each leg 58.

Each leg 58 is reinforced so as to maintain said leg 58 in an upright position by leg reinforcements 59. The leg reinforcements 59 are likewise constructed from sheet metal similar to that used in the construction of the foot stand 56. Each reinforcement 59 is square in shape with rounded corners. A width of the reinforcements 59 is equal to a width of the metal stripping about the perimeter of the leg 58. The reinforcements 59 are oriented upright with their planar faces perpendicular to an outside planar face of the leg 58. Each reinforcement 59 is welded on one of its length-wise sides to the outside face of the leg 58 and on one of its width-wise sides to a top surface of the foot stand 56.

The leg 58 that is o the side of the hide pulling machine 20 nearest hide pulling pin 26 takes the shape of an upright isosceles triangle with each of its three angles flattened so that the leg 58 is flat on the top and at both bottom angles of the triangle where the leg 58 is fixed to the foot stand 56.

The leg 58 located on the side of the foot stand 56 nearest motor 24 is similarly shaped but additionally includes a cut-out thereby providing clearance for said motor 24.

The platform assembly 19 is positioned between the two legs 58. Platform 22 is constructed from sheet metal similar to that used in the construction of the foot stand 56 and is rectangular in shape. The platform 22 is reinforced by a box shaped framing 74 which is welded about the perimeter of the platform at said platform's 22 lower surface 54. The framing 74 is constructed from sheet metal of similar thickness to that used in the construction of the platform 22 and is oriented so that faces of said framing 74 are vertical when the platform 22 is horizontal. When the platform 22 is positioned horizontally, said platform's 22 planar upper face 21 is parallel to a planar top side of the foot stand 56.

Height adjustment braces 90 are located above the platform 22. The braces 90 are constructed from sheet metal similar to that used in the construction of the foot stand 56 and said braces 90 are oriented so as to be upright with each of said brace's 90 two planar faces oriented perpendicular to the upper face 21 of the platform 22. The braces 90 are shaped so that they form an arch above the platform 22.

There are two braces 90 and each is fixed to the platform assembly 19 near lateral sides 33 of the platform 22 but not adjacent to or in alignment with the lateral sides 33 of the platform 22. Fins 62 are located to the outside of each brace between said brace and the lateral side 33 of the platform 22. The fins 62 are constructed from sheet metal similar to that used in the foot stand 56, are oriented upright, and are welded to the brace 90 and the platform 22 thereby reinforcing said brace 90 in an upright position. The braces 90 are further reinforced by brace struts 92 that are fixed between the two braces 90 and said struts are welded to inside faces of each of the braces 90 near top ends of said braces. There are two struts 92, one located near a back side of the brace 90 and one near the front side of the brace 90. Each strut 92 is oriented so that a centerline of the cylindrically shaped strut is parallel to the upper face 21 of the platform 22.

The platform assembly 19 is pivotally connected to the legs 58 near tops of the legs 58. A portion of a tilt bearing assembly 60 is incorporated into each leg 58. Bearing blocks 94 are fixed to the platform 22 so that tilting shaft 76 may be aligned within the portion of the tilt bearing assembly 60 in each leg 58 and the bearing blocks 94 fixed to the platform 22. In this manner the platform assembly 19 is pivotally connected to the legs 58.

Together, the bearing assembly 60 with the tilting shaft 76 and bearing blocks 94 form hinge 23. Once the shaft 76 is in place, said shaft 76 is fixed laterally so that said shaft 76 does not tend to migrate as motion of the platform assembly 19 occurs with respect to the base unit 36. The hinge 23 facilitates tilting of the platform assembly 19 about a longitudinal center line of the shaft 76; where said center line is also referred to as a tilt line.

Top plate 78 is located at a front corner of the platform 22, upon said platform's 22 upper face 21. The top plate 78 is rectangular in shape and constructed from sheet metal of similar thickness to that used in the construction of the foot stand 56. The top plate 78 is located so that a front edge of said top plate 78 is coplanar with a front side 32 of the platform 22 and a lateral edge of said top plate is coplanar with a lateral side 33 of the platform 22. The top plate 78 is elevated less than one foot above the upper face 21 of the platform 22 by risers 80 which are positioned so that faces of the riser 80 are upright upon the platform 22. The risers 80 are positioned between a top plate lower face 79 and the upper face 21 of the platform 22. The risers 80 are rectangular in shape and are constructed from sheet metal similar to that used in the construction of the foot stand 56. In the embodiment shown, the risers 80 are welded between the top plate 78 and the platform 22.

The hide pulling pin 26 is rotatably connected to the top plate 78. The hide pulling pin 26 is connected to the top plate 78 by two rotatable bearing assemblies 82. The bearing assemblies 82 are bolted to the top plate 78. There are holes in the bearing assemblies 82 through which a shaft end 46 of the pulling pin 26 is positioned.

The hide pulling pin 26 includes a hide engaging end 42 opposite the shaft end 46. The hide engaging end 42 and the shaft end 46 share a common center line.

The hide engaging end 42 is constructed from a solid piece of cylindrical shafting where said shafting has an outer diameter of about ten inches and a length of about forty inches. A slot 50 is cut into the shafting across a diameter of the hide engaging end 42 from a distal end of said engaging end 42. The slot 50 is about three inches wide and extends from the distal end of the engaging end 42 towards the opposite end of the pulling pin 26 for a distance of about twenty-eight inches. This makes the slot 50 about three inches wide and about twenty-eight inches long.

When the slot 50 is cut into the pulling pin 26, two prongs 52 are created; one prong 52 each on either side of the slot 50. The two prongs 52, together with the slot 50 cause the hide engaging end 42 of the pulling pin 26 to resemble a large clothes pin. All edges of the prongs 52 are tapered and beveled for smoothness so that the pin 26 does not damage an animal hide 11 as said hide 11 is pulled from an animal carcass 10.

The shaft end 46 of the pulling pin 26 is connected to the engaging end 42 at a joining end that is opposite the distal end of said engaging end 42. The shaft end 46 is constructed from a solid piece of cylindrical shafting where said shafting has an outer diameter of about four inches and a length of about two feet. In this manner the shaft end 46 and the hide engaging end 42 are joined end-to-end. As previously described, the shaft end 46 is positioned within the rotatable bearing assemblies 82.

The hide engaging end 42 of the pulling pin 26 extends beyond the upper face 21 of the platform 22. There is no portion of the pulling machine 20 below the hide engaging end 42.

The hide pulling pin 26 is rotated by the motor 24. The motor 24 is hydraulically powered and is mounted to the upper face 21 of the platform 22. Mounting of the motor 24 includes fastening the motor 24 to mounting box 48. The box 48 has a back side into which the motor 24 is installed and two lateral sides, each of which is perpendicular to the back side. The three sides of the box 48 are welded together at right angles. The box 48 is welded to the upper face 21 about a lower edge of all three sides of the box 48 so that the motor is held fast with respect to the platform assembly 19.

Rotation from the motor 24 is transmitted by transfer shaft 38 to the pulling pin 26. Two universal joints 40 are required to connect the pulling pin 26 to the motor 24 because a center line of the motor 24 is at an angle to the center line of the pulling pin 26. One universal joint 40 is between one end of the transfer shaft 38 and the motor and the other joint 40 is between the opposite end of the transfer shaft 38 and the pin 26. In this orientation, a center line of the transfer shaft 38 is at an angle to the center line of the pulling pin 26. Also, the center line of the pulling pin 26 is parallel to the front side 32 of the platform 22 and a back side 34 of the platform 22. A majority of the motor 24 is located behind the box 48 away from the front side 32 of the platform 22. A portion of the motor 24 is located above the platform 22 and a portion of said motor 24 extends beyond a lateral side 33 of the platform 22. The cut-away in the leg 58 previously described is required to accommodate the motor's 24 projection beyond the lateral side 33 of the platform 22.

Safety guard 96 is provided incompliance with OSHA Safety Regulations. The guard 96 covers the universal joints 40 and the transfer shaft 38 so that objects are prevented from becoming entangled in the rotating universal joints 4 and transfer shaft 38. The guard is constructed from steel and extends from the mounting box 48 over the universal joints 40 and the transfer shaft 38 to a lateral edge of the top plate 78 so that the safety shield 96 terminates at an opposite end from the box 48 about the shaft end 46 of the hide pulling pin 26.

A top end of each height adjustment mechanism 30 is journalled to one of the braces 90 near the top of said brace 90 at a center point of the arch within said brace 90. A bottom end of the height adjustment mechanism 30 is journalled to the foot stand 56 by way of a connection plate that extends upwardly from said foot stand 56. The height adjustment mechanism 30 comprises a hydraulic cylinder together with a reciprocating piston where said piston extends and retracts within the cylinder in response to applied hydraulic pressure. In this way, the height adjustment mechanism 30 is connected between the platform assembly 19 and the base unit 36.

A hydraulic fluid distribution assembly 84 is located at the back side 34 of the platform assembly 19. The distribution assembly 84 is designed to dispatch and receive hydraulic fluid both to and from the motor 24 and the height adjustment mechanisms 30. The provision of fluid to the motor is made through hydraulic motor fluid hose 66. Hydraulic fluid is channeled to the height adjustment mechanisms 30 from the distribution assembly 84 through hydraulic height adjustment fluid hoses 67.

There are two primary operations performed by the hide pulling machine 20. The first is rotation of the pulling pin 26. The removal of the hide 11 from an animal carcass 10 by this invention requires that the carcass 10 be first hung by its hind legs 12 so that the body of the animal is hanging vertically with its hind end upward and its head end downward near the floor of the processing plant. The carcass 10 is suspended from motorized tracts that pass the carcass 10 by the front side 32 of the platform 22. When the carcass 10 is positioned along side the hide engaging end 42 of the pulling pin 26, the carcass is stopped and said carcass is hung from that position during the pulling process.

As the animal carcass 10 passes by the pulling machine 20 and is positioned along side the hide engaging end 42 of the pulling pin 26, contact between the carcass 10 and the rotating components is prevented by the safety guard 96 between the carcass 10 and the motor 24.

In order for the hide engaging end 42 to be attached to the animal's hide 11, a portion of said hide must be initially detached from the hind end of the carcass 10. This initial detachment of the hide 11 is accomplished manually and creates skin flap 88. The amount of hide 11 detached must be sufficient to be inserted into the slot 50 of the pulling pin 26 and then rapped about the hide engaging end 42 of the pin 26. As the pulling process begins, the hide 11 is wrapped tightly about the no rotating pulling pin 26 and the hide 11 does not slip from the pin 26 but instead wraps more tightly as the process proceeds.

The pulling pin 26 is adjustable with respect to height above the floor of the processing plant to accommodate animal carcasses 10 of varying sizes and types. Adjustment of the height of the pulling pin 26 is accomplished by extending and retracting the height adjustment mechanism 30. As previously described, the platform assembly 19 is pivotally connected to the base unit 26. The platform assembly 19 tilts with respect to the base unit 36 in response to extension and retraction of the height adjustment mechanism 30. The tilt line about which the platform 22 assembly 19 tilts is located above the platform 22 and between the front side 32 and the back side 34 of the platform 22. When the platform 22 is horizontal the horizontal distance between the center line of the pulling pin 26 and the tilt line is at least as great as the horizontal distance between a center line of the height adjustment mechanism 30 and the tilt line. In this orientation, a leveraging effect is experienced when the height adjustment mechanism 30 is extended and retracted so that the pulling pin 26 is raised a greater distance than a reduction in the length of the height adjustment mechanism 30 as the piston is retracted into the cylinder. Conversely, the pulling pin 26 is lowered a greater distance than a length by which the height adjustment mechanism 30 is extended.

The embodiment shown and described above is only exemplary. I do not claim to have invented all the parts, elements or steps described. Various modifications can be made in construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The method for removing a hide from an animal carcass that includes the following steps:
    a. suspending an animal carcass by said carcass' hind legs so that the carcass hangs with a head end of the carcass downward and a hind end of the carcass upward,
    b. positioning the carcass adjacent to a hide pulling machine having a platform upon which a motor connected to a hide pulling pin is fixed,
    c. loosening a portion of a hide from the carcass, thereby
    d. forming a skin flap that hangs from the carcass,
    e. attaching the skin flap to the pulling pin, and
    f. pulling the hide from the carcass, wherein the improved method for removing the hide from the animal carcass comprises:

f1. mounting the platform to a base unit so that a hinge is formed between said platform and said base unit, f2. positioning the hide pulling pin so that a center line of said pin is parallel to and away from a horizontal tilt line about which said platform moves when said platform is tilted on said hinge, f3. positioning the motor so that said motor is on an opposite side of said pin's center line from the carcass, thereby f4. maintaining a greater distance between the carcass and the motor than between the carcass and the pulling pin, f5. mounting the motor and the pin to the platform so that the orientation between said pin and said motor remains unchanged throughout the hide removal process, thus maintaining the carcass in a sanitary condition by preventing the carcass from contacting portions of the motor.

2. The method as defined in claim 1 further comprising:

l. journalling the platform to a height adjustment mechanism, m. repositioning the platform relative to a floor of a processing plant with the height adjustment mechanism by n. raising or lowering the hide pin to a position near the loosened skin flap, by n1. tilting the platform about the tilt line thereby n2. revolving the pin about the tilt line and resulting in said pin being raised or lowered with respect to the floor of the processing plant floor, o. affecting said attachment of the skin flap to the pulling pin by placing said flap into a slot between two prongs of the pulling pin, and p. rotating said pulling pin so that the hide wraps about the pulling pin thereby, q. stripping the hide from the animal carcass.

3. The method for removing a hide from an animal carcass as recited in claim 1 wherein the step of mounting the motor and the pin to the platform further comprises:

l. fixing the motor and the pulling pin on parallel planar surfaces of the platform.

4. An animal hide pulling machine having:

a. a base unit that rests on a floor of a processing plant, b. a platform assembly, including a platform, is located above the base unit, c. a hide pulling pin rotatingly connected to the platform, and d. a motor fixed to the platform and connected to the pulling pin, wherein the improvement comprises:

e. said hide pulling pin having on opposite ends a shaft end and a hide engaging end, f. the hide pulling pin being oriented so as to allow a hide of an animal carcass to be easily attached to said hide engaging end of the pulling pin, g. the shaft end of the pulling pin is connected to one end of a transfer shaft, h. an opposite end of the transfer shaft is connected to the motor, j. a center line of the pulling pin is parallel to a front side of the platform, k. a center line of the transfer shaft is at an angle to the center line of the pulling pin, l. a center line of the motor is at an angle to the center line of the pulling pin, and m. the motor is positioned away from the front side of the platform and the pulling pin.

5. The invention as defined in claim 4 further comprising:

n. a hinge interconnecting the platform assembly and the base unit so that said platform assembly tilts about o. a tilt line, p. the tilt line is parallel to and between the front side and a back side of the platform, and q. the horizontal distance between the tilt line and a center line of the pulling pin is at least as great as the horizontal distance between said tilt line and a center line of a height adjustment mechanism when the platform is horizontal.

6. The invention as defined in claim 5 further comprising:

r. the platform assembly being journalled to a height adjustment mechanism, s. the height adjustment mechanism is extendable and retractable, and t. the hide pulling pin is located near the front side of the platform.

7. The invention as defined in claim 6 further comprising:

u. the height adjustment mechanism is a reciprocating piston within a cylinder.

8. The invention as defined in claim 6 further comprising:

u. the transfer shaft is connected between the pulling pin and the motor by universal joints at each end of said transfer shaft so that said joints transmit rotation from the motor to the pulling pin.

9. The invention as defined in claim 8 further comprising:

u. a safety guard oriented about the universal joints and the transfer shaft.

10. The invention as defined in claim 6 further comprising:

u. the pulling pin is rotatably connected to the platform assembly by a rotatable bearing assembly, v. the hide engaging end of the pulling pin extends beyond a lateral side of the platform so that no portion of the pulling machine extends below a distal end of said hide engaging end, and w. the shaft end is cylindrical in shape and is held within the rotatable bearing assembly.

11. The invention as defined in claim 6 further comprising:

u. the motor being hydraulically powered.

12. The invention as defined in claim 6 further comprising:

u. the height adjustment mechanism being hydraulically powered.

13. The invention as defined in claim 6 further comprising:

u. the hide engaging end of the pulling pin being constructed from a solid piece of cylindrical shafting having an outer diameter of about ten inches and a length of about forty inches, v. a slot being cut into the shafting across the diameter of the pin, w. the slot being about three inches wide and extending from the engaging end of the pin along the pin's length for about twenty-eight inches, x. two prongs, one on either side of the slot, y. edges of the prongs are tapered and beveled for smoothness,
z. a shaft end of the pulling pin is constructed from a solid piece of cylindrical shafting having an outer diameter of about four inches and a length of about two feet, and
aa. the shaft end of the pulling pin and the hide engaging end of the pulling pin are joined end-to-end.

14. The invention as defined in claim 7 further comprising:
v. the transfer shaft is connected between the pulling pin and the motor by universal joints at each end of said transfer shaft so that said joints transmit rotation from the motor to the pulling pin,
w. a safety guard oriented about the universal joints and the transfer shaft,
x. the pulling pin is rotatably connected to the platform assembly by a rotatable bearing assembly,
y. the hide engaging end of the pulling pin extends beyond a lateral side of the platform so that no portion of the pulling machine extends below a distal end of said hide engaging end,
z. the shaft end is cylindrical in shape and is held within the rotatable bearing assembly,
aa. the motor being hydraulically powered,
bb. the height adjustment mechanism being hydraulically powered,
cc. the hide engaging end of the pulling pin being constructed from a solid piece of cylindrical shafting having an outer diameter of about ten inches and a length of about forty inches,
dd. a slot being cut into the shafting across the diameter of the pin,
ee. the slot being about three inches wide and extending from the engaging end of the pin along the pin's length for about twenty-eight inches,
ff. two prongs, one on either side of the slot,
gg. edges of the prongs are tapered and beveled for smoothness,
hh. a shaft end of the pulling pin is constructed from a solid piece of cylindrical shafting having an outer diameter of about four inches and a length of about two feet, and
jj. the shaft end of the pulling pin and the hide engaging end of the pulling pin are joined end-to-end.

15. An animal hide pulling machine having:
a. a base unit that rests on a floor of a processing plant,
b. a platform assembly, including a platform, is located above the base unit,
c. a hide pulling pin rotatingly connected to the platform, and
d. a motor fixed to the platform and connected to the pulling pin, wherein the improvement
e. the platform assembly interconnected to the base unit by a hinge so that said platform may be tilted with respect to said base unit,
f. a longitudinal axis of the hinge being a tilt line about which the platform is tiltable,
g. the pulling pin having a center line parallel to the tilt line so that the pin's center line revolves about the tilt line as the platform is tilted on the hinge,
h. the platform has a front side positioned to be located adjacent to a carcass from which the carcass' hide is to be pulled,
j. the platform has a back side parallel to and opposite the front side,
k. the pulling pin is located nearer the front side than the back side,
l. a height adjustment mechanism journalled to the platform assembly nearer the back side than the front side for tilting said platform assembly about the tilt line.

16. An animal hide pulling machine as recited in claim 15 further comprising:
m. with the platform assembly in a horizontal position, a horizontal distance between the center line of the pulling pin and the tilt line is at least as great as the horizontal distance between said tilt line and the height adjustment mechanism.

* * * * *